UNITED STATES PATENT OFFICE.

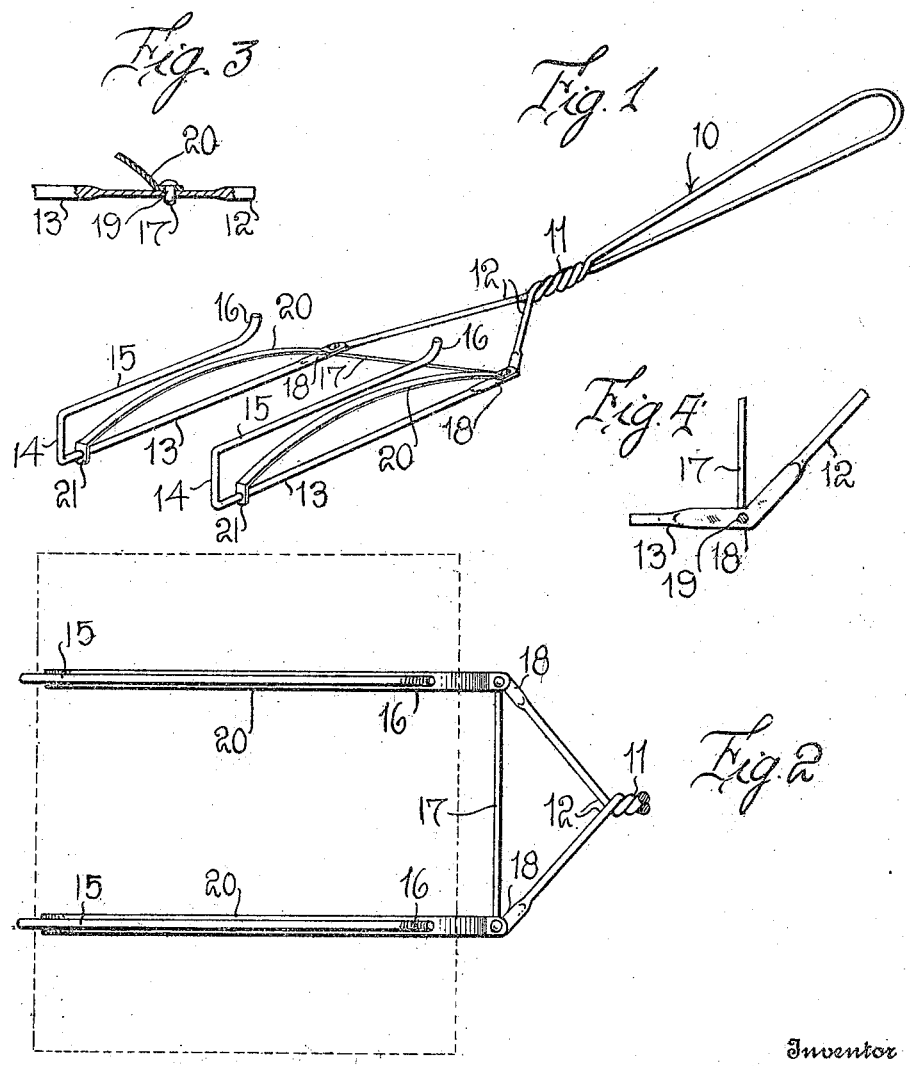

FRED LINCOLN RIGGS, OF MACOMB, ILLINOIS.

TOASTING DEVICE.

1,242,725.   Specification of Letters Patent.   Patented Oct. 9, 1917.

Application filed February 8, 1917. Serial No. 147,451.

*To all whom it may concern:*

Be it known that I, FRED LINCOLN RIGGS, a citizen of the United States, residing at Macomb, in the county of McDonough and State of Illinois, have invented certain new and useful Improvements in Toasting Devices, of which the following is a specification, reference being had to the accompanying drawings.

This invention relates to culinary appliances and particularly to devices for supporting bread while it is being toasted.

One object of my invention is the provision of a very simple device of this character which may be cheaply constructed, which is easily handled, and which has no bars which extend across the bread and interfere with the uniform toasting thereof.

A further object is to provide a construction of this character so formed that there are no clamps which must be positively shifted to release the bread after it is toasted and another object is to provide means for holding the bread in place while it is being toasted but permitting the ready removal of the bread.

Figure 1 is a perspective view of my toaster;

Fig. 2 is a fragmentary top plan view thereof;

Fig. 3 is a fragmentary sectional view of one of the legs 13 and the spring 20; and Fig. 4 is a fragmentary top plan view of a part of the toaster showing the portions 13 and 12 at their juncture and the manner in which the brace 17 is connected thereto.

Referring to these figures, it will be seen that my device comprises a handle designated generally 10 which is formed of a length of wire twisted at its middle as at 11. The two legs forming the wire handle are divergently directed beyond the twist 11 as at 12 and then extended forward parallel to each other as at 13, then upwardly bent as at 14, and returned upon themselves as at 15, these returned portions 15 being slightly resilient and having their terminal ends outwardly bent as at 16. Preferably a brace or cross piece 17 intersects the portions 13 at their juncture with the portions 12 and to this end the wire forming the portions 12 is flattened at this point as at 18 and this cross brace has angularly bent ends inserted through these flattened portions 18 and overturned.

Preferably and in order to hold the slice of bread firmly in place within the toaster while permitting its ready removal, I provide on each of the legs of the toaster the bowed springs 20. These springs are rigidly attached at one end by perforating the ends of the springs and permitting the angular ends 19 of the cross brace 17 to pass through these perforations and be overturned thereon. The other end of each spring is angularly bent as at 21 and perforated for the passage of the wire 13 so that this end of the spring is free to slide.

In practical use, the bread is slipped between the portions 15 and the springs 21 and held in this position by the springs. Under these circumstances, the toaster may be readily turned and otherwise manipulated to present the bread properly to the heat and the bread may be readily removed from the toaster without the necessity of opening any clamps.

Having described my invention, what I claim is:

1. A toaster of the character described comprising a handle and two parallel legs laterally spaced from each other and forming an extension of the handle, each of said legs at its ends being angularly bent and then rearwardly extended, and bowed springs attached at their rear ends to said legs and at their forward ends being slidingly engaged with the legs, the springs being disposed below said returned portions of the legs and bowing toward said return portions.

2. A toaster of the character described comprising a handle and two parallel laterally spaced legs attached to the handle, each of said legs at its end being angularly bent and then rearwardly extended, the main portion of the leg and said angular extension being approximately parallel to each other, and a spring on one of said portions of each leg extending toward and yieldingly urged toward the other parallel portion of the leg.

3. A toaster of the character described formed of a length of wire doubled upon itself and twisted to form a handle and then divergently bent and then extended in parallel relation to form parallel legs, the legs being then bent at right angles and then rearwardly extended, a cross brace connecting the rear ends of the parallel portions, and upwardly bowed springs attached at their rear ends to said parallel portions and at their forward ends angularly bent and perforated to slidingly engage the outer ends of the parallel portions.

In testimony whereof I hereunto affix my signature in the presence of two witnesses.

FRED LINCOLN RIGGS.

Witnesses:
CHAS. E. FLACK,
MAUD PATTERSON.